United States Patent

Keady

[11] 3,727,989
[45] Apr. 17, 1973

[54] EMERGENCY BYPASS FOR BRAKE PRESSURE CONTROL

[75] Inventor: Frederick D. Keady, Arlington, Mass.

[73] Assignee: The Weatherhead Company, Cleveland, Ohio

[22] Filed: Feb. 16, 1972

[21] Appl. No.: 226,907

[52] U.S. Cl. ................................303/6 C, 188/349
[51] Int. Cl. ................................................B60t 8/26
[58] Field of Search ..........................303/6 C, 84 A; 188/349

[56] References Cited

UNITED STATES PATENTS

| | | | |
|---|---|---|---|
| 3,532,390 | 10/1970 | Bueler | 188/349 |
| 3,556,607 | 1/1971 | Shutt et al. | 188/349 X |
| 3,667,810 | 6/1972 | Silagy | 303/6 C |

*Primary Examiner*—Allen N. Knowles
*Attorney*—Harold F. McNenny et al.

[57] ABSTRACT

A motor vehicle dual hydraulic brake system is disclosed having a front brake circuit and a rear brake circuit. A warning switch actuates an alarm device in response to a pressure failure in one of the circuits. A pressure modulating valve in the rear circuit maintains increases in rear brake pressure less than increases in front brake pressure when the front brake pressure exceeds a predetermined pressure. The warning switch is disposed forwardly of the fire wall of the motor vehicle and includes two front circuit outlet ports for supplying fluid pressure to the two front brakes. The pressure modulating valve is disposed adjacent the rear axle of the motor vehicle and includes two outlet ports for supplying fluid pressure to the two rear wheel brakes. An emergency control means which includes a solenoid is operable by the warning switch to render the pressure modulating valve inoperable in the event of a fluid pressure failure in the front circuit.

11 Claims, 3 Drawing Figures

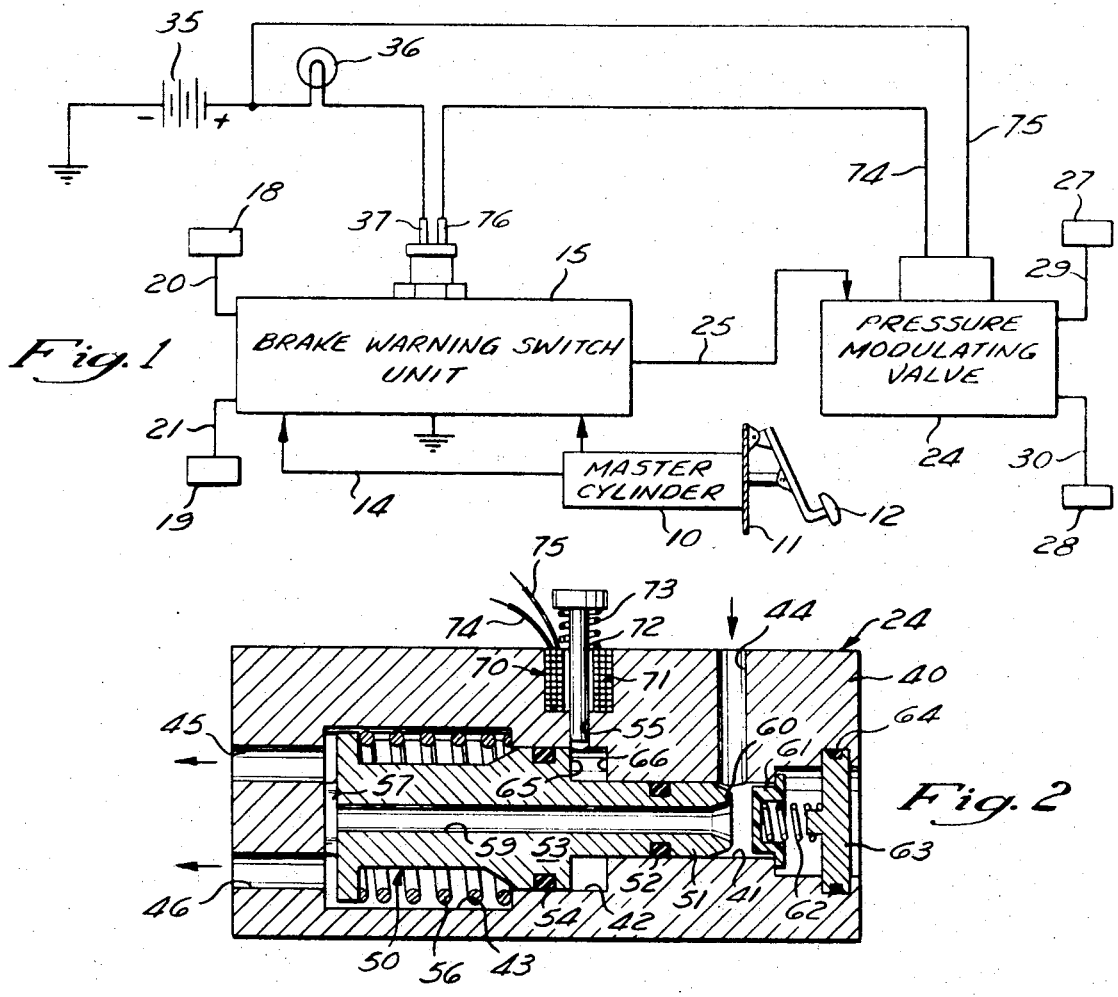
Fig. 1
Fig. 2
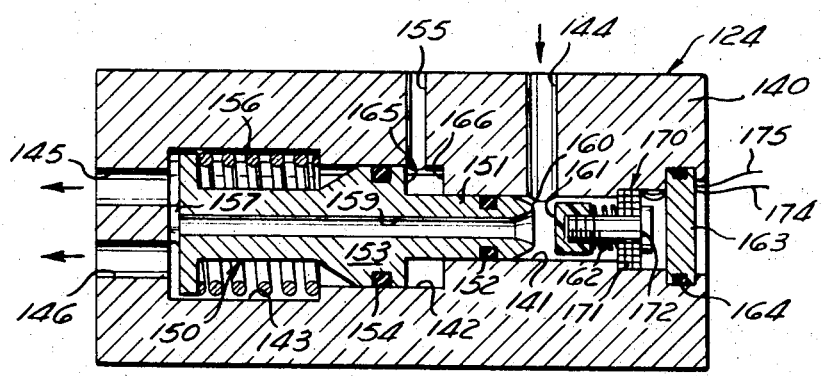
Fig. 3

3,727,989

EMERGENCY BYPASS FOR BRAKE PRESSURE CONTROL

BACKGROUND OF THE INVENTION

This invention relates generally to dual hydraulic brake systems and pressure modulating or proportioning valves for use therein. More particularly, this invention relates to an emergency control for rendering a brake pressure modulating valve in one circuit of a dual hydraulic brake system inoperable in the event of a fluid pressure failure in another circuit of the system.

In conventional motor vehicle dual hydraulic brake systems, the master cylinder supplies fluid pressure to the front brake circuit and to the rear brake circuit separately so that a failure in one of the circuits does not result in a total loss of braking function of the vehicle. In such systems, a brake pressure modulating or proportioning valve may be provided in the rear brake circuit to maintain the rear brake circuit at a pressure proportionally lower than the front brake circuit pressure to prevent premature lock-up of the rear wheels resulting from a weight transfer to the front wheels. When such pressure modulating valves are used in dual hydraulic brake circuits, it is sometimes desirable or necessary to render such valves inoperable when there has been a failure in the front circuit, so that full master cylinder pressure is applied to the rear brakes.

It is presently common to utilize the movement of the actuating piston of the warning switch to bypass the rear brake circuit modulating or proportioning valve in the event of failure in the front brake circuit. An alternative solution has been to combine the proportioning valve with the warning switch in a single unit arranged so that operation of the switch renders the proportioning valve inoperative. However, all such prior art devices have required that the warning switch and the proportioning valve be located adjacent one another.

SUMMARY OF THE INVENTION

The present invention provides a novel emergency control mechanism for rendering a pressure modulating valve in one circuit of a motor vehicle dual hydraulic brake system inoperable in the event of a failure in the other circuit of the dual brake system. The invention provides such an emergency control which is actuated by the warning switch of the dual brake system, but which can be located remote from the warning switch.

In the preferred embodiment, a dual hydraulic brake system is provided having a front circuit and a rear circuit. A warning switch actuates an alarm device in response to a fluid pressure failure in either of the circuits. A pressure modulating or proportioning valve is arranged in the rear circuit and includes a differential area piston. The differential area piston is spring biased to a first position and is movable from the first position for maintaining increases in rear brake pressure less than increases in front brake pressure when the front and rear brake pressures exceed a predetermined pressure.

The warning switch is disposed forwardly of the fire wall of the motor vehicle and includes two outlet ports for supplying brake fluid to the two front wheel brakes. The pressure modulating valve is disposed rearwardly of the fire wall toward the rear of the motor vehicle and includes two outlet ports for supplying fluid pressure to the two rear wheel brakes. An emergency control means is operable by the warning switch to render the pressure modulating valve inoperable in the event of a fluid pressure failure in the front circuit.

BRIEF DESCRIPTION OF THE DRAWINGS

The foregoing and other and additional features and advantages of the invention will be readily apparent to those skilled in the art upon an understanding of the preferred embodiment of the invention and an alternate embodiment of the invention shown in the accompanying drawings, wherein:

FIG. 1 is a schematic circuit diagram of a motor vehicle dual hydraulic brake system incorporating the present invention;

FIG. 2 is a cross-sectional side elevational schematic view of the preferred embodiment of the pressure modulating or proportioning valve of the system shown in FIG. 1; and FIG. 3 is an alternate embodiment of the pressure modulating or proportioning valve of the system shown in FIG. 1.

DETAILED DESCRIPTION OF THE EMBODIMENTS

Referring now to the drawings in greater detail, FIG. 1 is a schematic circuit diagram of a motor vehicle dual hydraulic brake system incorporating the present invention. A dual or tandem master cylinder 10 is connected to the fire wall or chassis 11 of the motor vehicle and is actuated by a force applied to a brake pedal 12 by the operator of the motor vehicle. A force applied to the brake pedal 12 supplies pressurized hydraulic brake fluid through a rear brake supply line 13 and a front brake supply line 14 to a brake warning switch unit 15 in a well known manner. The warning switch unit is preferably of the type such as shown in U.S. Pat. No. 3,536,874 to Remy J. Van Ophem, wherein the warning switch remains continuously actuated in the event of failure in the front or rear brake circuit.

The warning switch unit 15 includes two front brake outlet ports which supply the brake fluid from line 14 to front wheel brakes 18 and 19 through brake lines 20 and 21, respectively. The warning switch 15 has a single rear outlet port which supplies brake fluid to a pressure modulating valve 24 through a brake line 25.

As shown in the preferred embodiment, the warning switch unit 15 is located forwardly of the fire wall 11. This permits the warning switch unit 15 to distribute the front brake fluid to the front brakes 18 and 19 without requiring a separate connector or manifold so that the warning switch unit 15 takes the place of the manifold. As seen in FIG. 1, the modulating valve 24 is located rearwardly of the fire wall 11 remote from the warning switch unit 15. This permits the proportioning valve 24 to supply brake fluid directly to rear brakes 27 and 28 through lines 29 and 30, respectively. In the preferred embodiment, the modulating valve 24 is located adjacent the rear axle of the motor vehicle, so that the modulating valve 24 takes the place of the connector or manifold which has previously been required to supply the brake fluid to the two rear brakes.

An electrical storage battery 35 has one terminal electrically connected to an indicator lamp 36, which may be suitably mounted on the dashboard of the motor vehicle to warn the vehicle operator of a failure in the front or rear circuit of the dual brake system in a well known manner. The other terminal of the battery 35 is connected to ground, and the indicator lamp 36 is electrically connected to a terminal 37 of the warning switch unit 15. The warning switch unit 15 provides a ground connection for the terminal 37 to light the indicator lamp 36 in the event of such failure.

The structural details of the pressure modulating valve 24 are shown in detail in FIG. 2. The general structure and operation of this valve under normal operating conditions (that is, when there has been no fluid pressure failure in the front or rear circuits of the dual brake system) are similar to that of the valve shown in U.S. Pat. No. 3,623,776 granted Nov. 30, 1971 to Ellis M. Wellman.

The pressure modulating valve 24 includes a housing 40 having a bore 41, a first counterbore 42, and a second counterbore 43. An inlet port 44, which may be provided with a suitable threaded opening for receiving an inverted flare type fitting in a well known manner, is provided to receive brake fluid from the master cylinder 10 through the line 25. Outlet ports 45 and 46, which may also be provided with suitable threaded openings for receiving inverted flare type fittings, supply the brake fluid to the rear brakes 27 and 28 through the lines 29 and 30.

A differential area pressure modulating or proportioning piston 50 is slidably disposed in the housing 40. A smaller diameter portion 51 of the differential area piston 50 carries a suitable O-ring seal 52 and is slidably and sealingly engaged in the bore 41. A larger diameter portion 53 of the differential area piston 50 carries a seal 54 and is slidably and sealingly disposed in the first counterbore 42. The annular cross-sectional area differential between the smaller diameter portion 51 and larger diameter portion 53 is exposed to atmospheric pressure through a vent passage 55. A spring 56 biases the piston 50 to the position shown in FIG. 2 against a suitable fluted stop 57.

A passage 59 extends from end to end through the differential area piston 50. A portion of the piston 50 surrounding the right end of the passage 59 provides a valve head 60. A suitable valve seat 61, which is of nylon in the preferred embodiment, is disposed in the housing 40 for cooperating with the valve head 60. The valve seat 61 is spring biased to the position shown in FIG. 1 by a coil spring 62 which acts between a plug member 63 and the valve seat 61. A suitable seal 64 prevents leakage of brake fluid between the plug member 63 and the housing 40.

Under low pressure conditions, such as occur in the braking system under very moderate braking conditions or while the braking shoes and/or pads are advancing toward their braking surfaces, the preload of the spring 56 retains the piston 50 in the position shown in FIG. 2. In this position, the pressure modulating valve does not vary or decrease the fluid pressure so that the outlet port pressure supplied to the rear brakes of the motor vehicle from the ports 45 and 46 is substantially equal to the inlet pressure supplied to the inlet port 44 from the master cylinder 10.

As the pressures increase, a force acting on the piston 50 due to the difference in the effective cross-sectional areas of the portions 53 and 51 tends to urge the piston 50 to the right. When this force exceeds the preload of the spring 56, the piston 50 will move to the right so that the valve head 60 engages the valve seat 61.

As the pressure in the inlet port 44 continues to increase, the difference in effective cross-sectional areas between the portions 51 and 53 results in a pressure increase in the outlet ports 45 and 46 which is less than, but proportional to, the pressure increases in the inlet port 44. The proportional relationship between the increase in inlet pressure and the increase in outlet pressure is equal to the proportional relation between the areas of the larger diameter portion 53 and the smaller diameter portion 51. Should any make-up fluid be required downstream of the valve 24, the piston 50 will move to the left so that the valve head 60 moves slightly away from the valve seat 61 to permit make-up fluid to flow between the valve head 60 and the valve seat 61. If this occurs, the pressure drop takes place across the valve elements 60 and 61 so that the space between them serves as a valve throttling area.

When the fluid pressure from the master cylinder 10 then decreases, the piston 50 and the valve seat 61 move to the right to maintain the same proportional relationship between inlet and outlet port pressures when the pressures are decreasing as was maintained when the pressures were increasing. When the point is reached at which the inlet port pressure decreases below the outlet port pressure, a shoulder 65 of the piston 50 engages a shoulder 66 of the housing 40 to prevent further movement of the proportioning piston 50 to the right. When this occurs, the valve seat 61 moves further to the right against the bias of the spring 62 to act as a check valve to re-establish open fluid pressure communication between the inlet port 44 and the outlet ports 45 and 46. When the pressure is reached at which the proportioning piston 50 was initially displaced from its leftward position against the bias of the spring 56, the spring 56 returns the piston 50 to the position shown in FIG. 2.

In the event of abnormal operating conditions caused by fluid pressure failure in the front brake circuit, it is desirable to render the rear brake circuit pressure modulating valve inoperable so that full brake pressure can be supplied to the rear wheel brakes under such emergency conditions. In the past, this has necessitated positioning the rear brake circuit pressure modulating valve closely adjacent the brake warning switch so that the movement of the actuating member of the brake warning switch could be used either to bypass the proportioning valve or to render it inoperable. In contrast to these prior art devices, the present invention provides an emergency control which renders the rear brake circuit pressure modulating valve inoperable in the event of fluid pressure failure in the front brake circuit, yet does not require positioning the pressure modulating valve adjacent the warning switch. In this manner, the pressure modulating valve may be positioned adjacent the rear axle of the motor vehicle so that it may replace the connector or manifold presently commonly used to supply brake fluid pressure to the rear wheel brakes from a single line extending from the front of the motor vehicle.

This is accomplished in the preferred embodiment of the invention by providing a solenoid means 70. The solenoid means 70 includes a solenoid winding or coil 71 and a solenoid core or stop member 72 spring biased to the position shown in FIG. 2 by a suitable spring 73. Lead wires 74 and 75 extend from the solenoid winding 71. Lead wire 75 is connected to the positive side of the battery 35, and lead wire 74 is connected to a terminal 76 on the warning switch unit 15. The terminal 76 is, in the same manner as the terminal 37, normally insulated from ground but is grounded by the warning switch unit 15 in the event of a fluid pressure failure in the front brake circuit.

In the event of such failure in the front brake circuit and grounding of the terminal 76, the solenoid 71 is energized. This urges the solenoid stop member 72 downwardly so that the stop member 72 is in the path of movement of the piston 50. In this manner, the stop member 72 engages the shoulder 65 of the piston 50 when the piston 50 begins its movement to the right so that the valve head 60 cannot engage the valve seat member 61. This maintains open fluid pressure communication between the inlet port 44 and the outlet ports 45 and 46 to render the proportioning valve inoperable and provide full brake pressure to the rear brakes 27 and 28 in the event of fluid pressure failure in the front brake circuit.

FIG. 3 shows an alternative embodiment wherein a pressure modulating valve 124 includes a housing 140 having a bore 141, a first counterbore 142, and a second counterbore 143. An inlet port 144, which may be provided with a suitable threaded opening for receiving an inverted flare type fitting in a well known manner, is provided to receive brake fluid from the master cylinder 10 through the line 25 when the valve 124 is used in the circuit shown in FIG. 1 in place of the valve 24. Outlet ports 145 and 146, which may also be provided with suitable threaded openings for receiving inverted flare type fittings, supply the brake fluid to the rear brakes 27 and 28 through the lines 29 and 30.

A differential area pressure modulating or proportioning piston 150 is slidably disposed in the housing 140. A smaller diameter portion 151 of the differential area piston 150 carries a suitable O-ring seal 152 and is slidably and sealingly engaged in the bore 141. A larger diameter portion 153 of the differential area piston 150 carries a seal 154 and is slidably and sealingly disposed in the first counterbore 142. The annular cross-sectional area differential between the smaller diameter portion 151 and larger diameter portion 153 is exposed to atmospheric pressure through a vent passage 155. A spring 156 biases the piston 150 to the position shown in FIG. 3 against a suitable fluted stop 157.

A passage 159 extends from end to end through the differential area piston 150. A portion of the piston 150 surrounding the right end of the passage 159 provides a valve head 160. A suitable valve seat 161, which is of nylon in the preferred embodiment, is disposed in the housing 140 for cooperating with the valve head 160. The valve seat 161 is spring biased to the position shown in FIG. 1 by a coil spring 162. A suitable seal 164 prevents leakage of brake fluid between a plug member 163 and the housing 140.

Under low pressure conditions, such as occur in the braking system under very moderate braking conditions or while the braking shoes and/or pads are advancing toward their braking surfaces, the preload of the spring 156 retains the piston 150 in the position shown in FIG. 3. In this position, the pressure modulating valve does not vary or decrease the fluid pressure so that the outlet port pressure supplied to the rear brakes of the motor vehicle from the ports 145 and 146 is substantially equal to the inlet pressure supplied to the inlet port 144 from the master cylinder 10.

As the pressures increase, a force acting on the piston 150 due to the difference in the effective cross-sectional areas of the portions 153 and 151 tends to urge the piston 150 to the right. When this force exceeds the preload of the spring 156, the piston 150 will move to the right so that the valve head 160 engages the valve seat 161.

As the pressure in the inlet port 144 continues to increase, the difference in effective cross-sectional areas between the portions 151 and 153 results in a pressure increase in the outlet ports 145 and 146 which is less than, but proportional to, the pressure increases in the inlet port 144. The proportional relationship between the increase in inlet pressure and the increase in outlet pressure is equal to the proportional relation between the areas of the smaller diameter portion 151 and the larger diameter portion 153. Should any make-up fluid be required downstream of the valve 124, the piston 150 will move to the left so that the valve head 160 moves slightly away from the valve seat 161 to permit make-up fluid to flow between the valve head 160 and the valve seat 161. If this occurs, the pressure drop takes place across the valve elements 160 and 161 so that the space between them serves as a valve throttling area.

When the fluid pressure from the master cylinder 10 then decreases, the piston 150 and the valve seat 161 move to the right to maintain the same proportional relationship between inlet and outlet port pressures when the pressures are decreasing as was maintained when the pressures were increasing. When the point is reached at which the inlet port pressure decreases below the outlet port pressure, a shoulder 165 of the piston 150 engages a shoulder 166 of the housing 140 to prevent further movement of the proportioning piston 150 to the right. When this occurs, the valve seat 161 moves further to the right against the bias of the spring 162 to act as a check valve to re-establish open fluid pressure communication between the inlet port 144 and the outlet ports 145 and 146. When the pressure is reached at which the proportioning piston 150 was initially displaced from its leftward position against the bias of the spring 156, the spring 156 returns the piston 150 to the position shown in FIG. 3.

In the event of abnormal operating conditions caused by fluid pressure failure in the front brake circuit, it is desirable to render the rear brake circuit pressure modulating valve inoperable so that full brake pressure can be supplied to the rear wheel brakes under such emergency conditions. This is accomplished in the preferred embodiment of the invention by providing a solenoid means 170. The solenoid means 170 includes a solenoid winding 171 and a solenoid core 172 spring biased to the position shown in FIG. 3 by the spring 162. Lead wires 174 and 175 extend from the solenoid winding 171. Lead wire 175 is connected to the positive side of the battery 35, and lead wire 174 is connected to the terminal 76 on the warning switch unit 15. The terminal 76 is, in the same manner as the terminal 37, normally insulated from ground but is grounded by the warning switch unit 15 in the event of a fluid pressure failure in the front brake circuit.

In the event of such failure in the front brake circuit and grounding of the terminal 76, the solenoid 171 is energized. Because the valve seat 161 is carried by the solenoid core 172, this urges the valve seat 161 to the right away from the valve head 160. In this manner, the valve seat 161 is moved to a position in which the valve head 160 cannot engage the valve seat member 161. This maintains open fluid pressure communication between the inlet port 144 and the outlet ports 145 and 146 to render the proportioning valve inoperable and provide full brake pressure to the rear brakes 27 and 28 in the event of fluid pressure failure in the front brake circuit.

Although a preferred and alternate embodiment of the invention have been disclosed and described in detail, various modifications and rearrangements as will become apparent to those skilled in the art may be made without departing from the scope of the invention as defined in the following claims.

What is claimed is:

1. A pressure modulating valve comprising a housing having an inlet port and an outlet port, a bore extending between said inlet port and said outlet port, a differential area piston slidably disposed in said bore, said differential area piston maintaining increases in outlet port pressure less than increases in inlet port pressure under normal operating conditions when said inlet port pressure exceeds a predetermined pressure, and solenoid means on said housing having coil means and core means for rendering said pressure modulating valve inoperable under abnormal operating conditions.

2. A pressure modulating valve as defined in claim 1 wherein said solenoid means includes means to block movement of said differential area piston under said abnormal operating conditions.

3. A pressure modulating valve as defined in claim 1 including valve means operable by said differential area piston to hydraulically isolate said inlet port from said outlet port under normal operating conditions when said inlet port pressure exceeds said predetermined pressure, and said solenoid means prevents operation of said valve means under said abnormal operating conditions.

4. A pressure modulating valve as defined in claim 1 including electrical connector means for electrically connecting said solenoid means to a warning switch for actuation of said coil means under said abnormal operating conditions, and said solenoid means rendering said pressure modulating valve inoperable only when said coil means is actuated.

5. In a motor vehicle dual hydraulic brake system, the combination of a first brake circuit, a second brake circuit, a warning switch for actuating an alarm device in response to a predetermined pressure differential between said first and second circuits, a pressure modulating valve in said first circuit, said pressure modulating valve including a housing having an inlet port and an outlet port, means in said housing for maintaining increases in outlet port pressure less than increases in inlet port pressure when said inlet port pressure exceeds a predetermined pressure, said warning switch being disposed forwardly of the fire wall of said motor vehicle and said pressure modulating valve being disposed remote from said warning switch and rearwardly of said fire wall of said motor vehicle, with emergency control means operable by said warning switch for rendering said pressure modulating valve inoperable in the event of a fluid pressure failure in said second circuit.

6. A combination as defined in claim 5 wherein said emergency control includes a solenoid on said housing, said solenoid having a coil and a movable core, means electrically connecting said warning switch and said coil so that said warning switch completes an electrical circuit through said coil to energize said coil in response to said predetermined pressure differential, and said solenoid rendering said pressure modulating valve inoperable when said coil is energized.

7. A combination as defined in claim 6 wherein said movable core includes stop means for blocking movement of said differential area piston when said solenoid is energized.

8. A combination as defined in claim 6 including a first valve element in said bore, a second valve element carried by said differential area piston for engaging said first valve element to hydraulically isolate said inlet port from said outlet port and maintain increases in outlet port pressure less than increases in inlet port pressure, and said first valve element is moved by said solenoid to a position remote from said second valve element when said solenoid is energized.

9. A combination as defined in claim 5 wherein said warning switch includes two outlet ports for supplying brake fluid to the front wheel brakes of said motor vehicle, and said pressure modulating valve is disposed adjacent the rear axle of said motor vehicle and includes two outlet ports for supplying brake fluid to the rear wheel brakes of said motor vehicle.

10. A pressure modulating valve comprising a housing having an inlet port and an outlet port, a bore extending between said inlet port and said outlet port, a differential area piston slidably disposed in said bore, said differential area piston being spring biased to a first position in said bore, said differential area piston moving from said first position and maintaining increases in outlet port pressure less than increases in inlet port pressure under normal operating conditions when said inlet port pressure exceeds a predetermined pressure, and stop means for blocking said movement of said differential area piston for rendering said pressure modulating valve inoperable under abnormal operating conditions.

11. In a motor vehicle dual hydraulic brake system, the combination of a first brake circuit, a second brake circuit, a warning switch for actuating an alarm device in response to a predetermined pressure differential between said first and second circuits, a pressure modulating valve in said first circuit, said pressure modulating valve including a housing having an inlet port and an outlet port, differential area piston means in said housing, said differential area piston means being spring biased to a first position and being movable from said first position for maintaining increases in outlet port pressure less than increases in inlet port pressure when said inlet port pressure exceeds a predetermined pressure, said warning switch being disposed forwardly of the fire wall of said motor vehicle and said pressure modulating valve being disposed remote from said warning switch and rearwardly of said fire wall of said motor vehicle, with emergency control means operable by said warning switch for blocking said movement of said differential area piston and rendering said pressure modulating valve inoperable in the event of a fluid pressure failure in said second circuit.

* * * * *